May 26, 1953     H. S. AUSHERMAN     2,639,623

BELT TIGHTENER AND SLACK ADJUSTER

Filed March 29, 1950     2 Sheets-Sheet 1

INVENTOR
Harry S. Ausherman
BY Frank J. Schraeder Jr.
Attorney

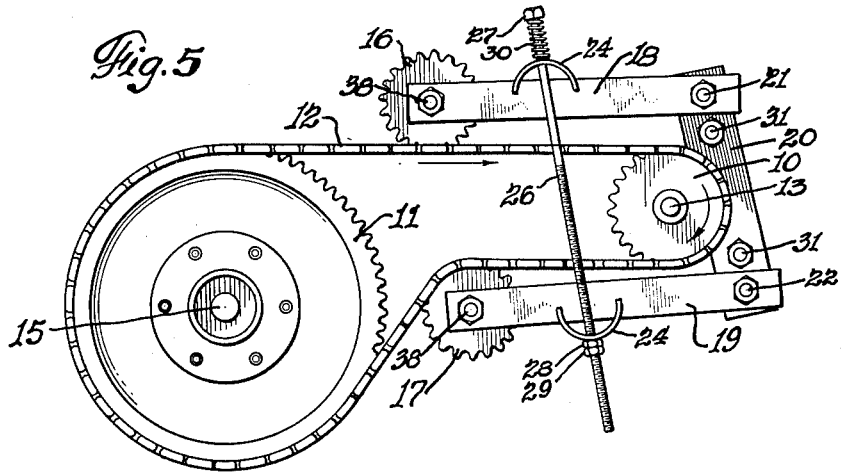
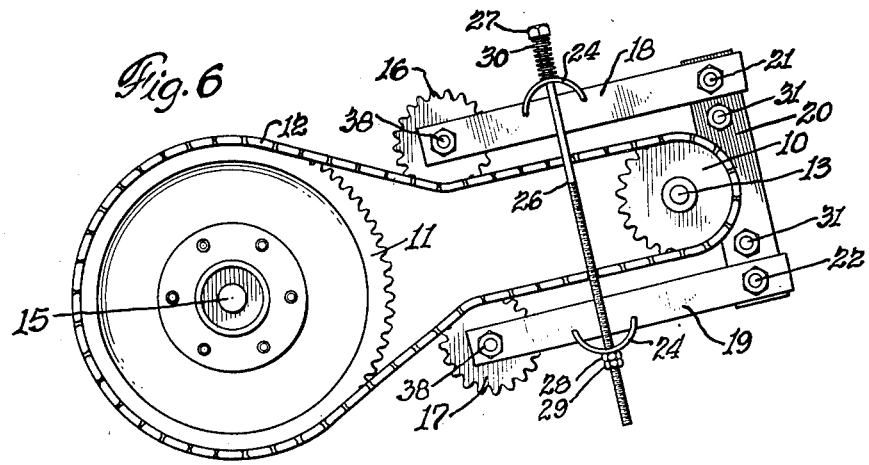
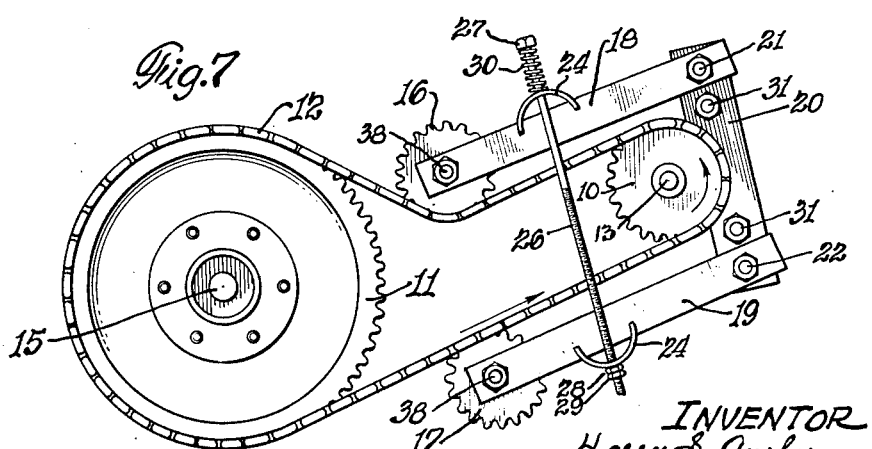

Patented May 26, 1953

2,639,623

UNITED STATES PATENT OFFICE 2,639,623

BELT TIGHTENER AND SLACK ADJUSTER

Harry S. Ausherman, Wichita, Kans.

Application March 29, 1950, Serial No. 152,532

4 Claims. (Cl. 74—242.11)

1

It is common practice to apply to endless belt drives yieldable pressure devices to take up slack and keep the belts taut; the pressure being exerted against the slack or idle run of the belt so that the run which pulls the load may remain straight while the slack or idle run is deflected. The conventional devices are satisfactory as long as the driving wheel turns in one direction only; but, in the case of a reversible driving wheel, such a slack adjuster and tightener will at times be required to deflect the power delivering run of the belt.

The object of the present invention is to produce a simple and novel slack adjuster and belt tightener that automatically adjusts itself in conformity to the direction of rotation of a reversible driving shaft, so as always to permit that run of the belt through which power is being transmitted to remain straight.

Figure 1:
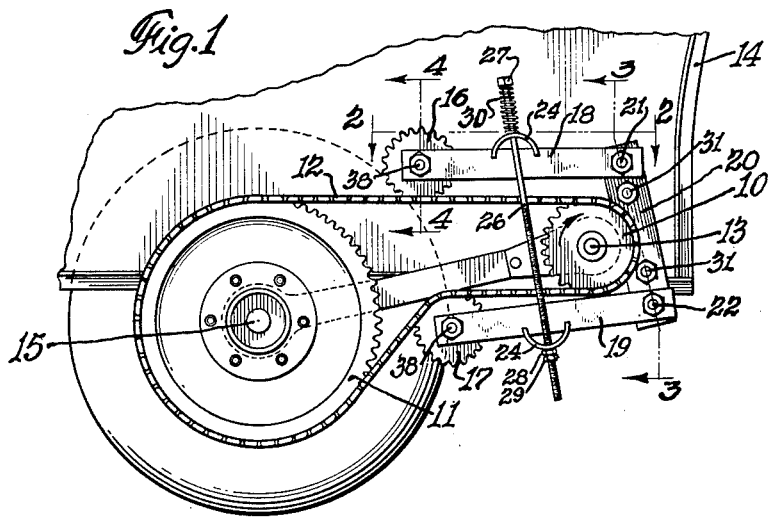
Figure 2:
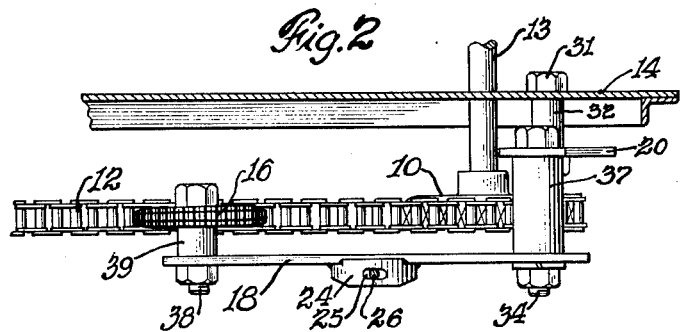
Figure 3:
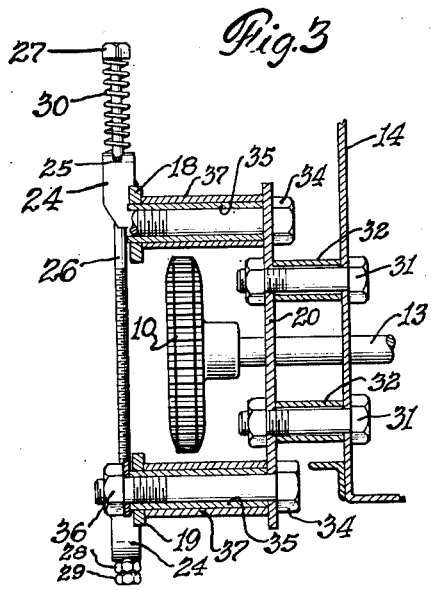
Figure 4:
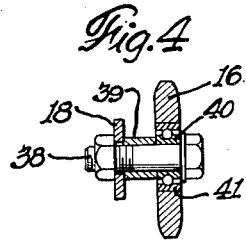

The various features of novelty whereby the present invention is characterized will hereinafter be pointed out with particularity in the claims, but for a full understanding of the invention and of its objects and advantages, reference may be had to the following detailed description taken in connection with the accompanying drawings, wherein:

Figure 1 is a side view of a portion of a vehicle driven by mechanism including a belt in the form of an endless sprocket chain, with a preferred embodiment of my invention applied to the chain; Fig. 2 is a section on line 2—2 of Fig. 1, but on a larger scale; Figs. 3 and 4 are sections taken, respectively, on lines 3—3 and 4—4 of Fig. 1, the scale being the same as in Fig. 2; Fig. 5 is a view similar to Fig. 1, on a larger scale, and showing only the two sprocket wheels and cooperating chain, in addition to the slack adjuster and chain tightener; Fig. 6 is a view like Fig. 5 but showing the slack adjuster and chain tightener in a neutral position; and Fig. 7 is a view like Fig. 5, with the parts in the positions assumed when the driving sprocket revolves in the opposite direction from that in Figs. 1 and 5.

In the drawings my invention is illustrated as applied to a sprocket chain drive, and, for the sake of brevity, the detailed description will be confined to this example; it being pointed out, however, that the endless flexible member may be a chain belt or any other kind of belt used in belt drives.

Referring to the drawings, 10 is a driving sprocket wheel, 11 is a driven sprocket wheel and 12 is an endless chain extending around these wheels and forming the driving connection between them. In the particular example given,

2 wheel 10 is on one end of a transverse power shaft 13 at the rear end of a vehicle body 14, while sprocket wheel 11 is coaxial with the rear axle 15 of the vehicle and may be assumed to drive the same in any conventional manner. The use to which the belt is put is, of course, unimportant, as the invention is applicable to other endless belt drives.

When sprocket wheel 10 turns in the clockwise direction, as viewed in Fig. 1, power is transmitted to the driven wheel 11 through a pull on the upper run of the chain which, when free to do so, forms substantially a straight line tangent to both sprocket wheels. At the same time, the idle lower run of the chain becomes slack. When the driving sprocket wheel turns in the counter-clockwise direction, the lower run of the chain becomes taut and the upper one becomes slack.

In accordance with my invention, means are provided to maintain a constant tightening pressure on the chain, but permitting the necessary deflection to occur in that run which at any given time is idling.

In the arrangement shown, there are two rotatable pressure devices, preferably toothed rollers 16 and 17, carried on corresponding ends of two bars or arms 18 and 19, respectively. These arms or bars are hinged at their other ends to a stationary supporting bar or plate member 20, as at 21 and 22; the hinge axes being preferably spaced apart a distance greater than the diameter of sprocket wheel 10. On each arm, about midway between the ends thereof, is a lateral projection or ear 24 that has therein a hole 25 slightly elongated in the direction of the length of the corresponding arm. Extending through the holes in the ears is a long rod 26 having a head 27 on its upper end and two nuts 28 and 29 on its lower end. The rod is sufficiently long to allow a compression spring 30, of considerable length, to be placed around the rod between the upper ear and the head or shoulder 27 on the rod. The rod is preferably screwthreaded throughout the greater part of its length to provide a wide range of adjustment of the pressure wheels 16 and 17 from and toward each other.

The ears 24 are preferably bowed, with their concave sides facing each other. This permits the spring 30 and nut to rock smoothly on the corresponding ears as the rod 26 changes its angular position relative to arms 18 and 19, during use, regardless of how close pressure wheels 16 and 17 are to each other.

The attachment just described may be secured to the vehicle in any suitable manner. As shown, member 20 is fastened in an approximately vertical position to the side of the vehicle body, behind drive shaft 13, by bolts 31, 31; with spacers 32, 32 surrounding the bolts between said member and the vehicle body. The arms 18 and 19 are supported at the outer ends of bolts 34, 34, parallel to bolts 31, and extending through supporting member 20 and the respective arms. Arms 18 and 19 are not journalled directly on bolts 34 but on sleeves 35 which surround these bolts and act as spacers between the member 20 and nuts 36 on bolts 34. Surrounding each sleeve 35 is a shorter sleeve 37 that serves as a spacer between the support 20 and the corresponding swinging arm.

In the arrangement just described, driving wheel 10 lies in a plane between the plane of support 20 and the plane in which arms 18 and 19 swing; rod 26 therefore lying outwardly from the plane of the sprocket wheels and chain. In order to bring the little toothed wheels 16 and 17 into the plane of the endless chain, they are supported on little stub shafts in the form of bolts 38; these bolts being surrounded by spacers each comprising a short sleeve and the stationary center portion 40 of a ball bearing, the outer rotary portion 41 of which is fixed in the corresponding pressure wheel.

When the unit, composed of the member 20 and the parts supported thereby, is attached to the vehicle body, the pressure wheels lie, respectively, on top of the upper run of the chain and directly underneath the lower run. The nut 28 is then screwed up on the rod, taking out the sag in the lower run and creating an upward deflection instead. This stresses spring 30 and gives the desired tightness to the chain. Should both runs of the belt be slack, both will be deflected toward each other, as in Fig. 6. In that case, however, as soon as the driving sprocket begins to turn, the slack in one run of the belt is eliminated and that run is straightened out. If the driving wheel turns in the clockwise direction as viewed in Fig. 1, the upper run of the chain immediately straightens as shown there and in Fig. 5, the deflection of the lower run increasing as that in the upper run decreases. Then, when the driving sprocket wheel is reversed, the lower run of the chain belt is drawn taught and straightens, as in Fig. 7; the deflection, to take up the slack, being transferred to the upper run.

It will be seen that the pressure of the little wheels 16 and 17 on the chain remains, for all practical purposes, constant, because the distance between their axes varies only negligibly throughout the range of their bodily shifting movements. I am therefore able to maintain a constant belt tightening force on a belt, while insuring that the take-up will always be in the salck or idle run regardless of the direction in which the drive shaft turns.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. The combination with an endless flexible member embracing a driving wheel and a driven wheel to cause the latter to be driven by the former, of a pair of pressure devices engaged with corresponding sides of the two runs of said flexible member, means supporting said devices for bodily movements in unison with each other in a path that intersects both runs of the flexible member as well as for movements from and towards each other, and means acting on said devices to cause each to exert a yielding pressure against the adjacent run of the flexible member comprising an elongated rod slidably connected with said devices and including a spring interposed between one end portion of said rod and one of said devices.

2. The combination with an endless flexible member embracing a driving wheel and a driven wheel to cause the latter to be driven by the former, a stationary support extending in a vertical plane disposed outside of a lateral plane that extends between the centers of the wheels, two arms pivoted at spaced points to said support for swinging movements in a common plane at right angles to the axes of the wheels and extending from their pivots in the same general direction toward the driving wheel and beside the flexible member, rolling pressure devices on the free ends of said arms and resting on the outer sides of the two runs of the flexible member, and a tie between said arm exerting a yieldable force thereon in the direction to draw the pressure devices toward each other.

3. A slack adjuster and belt tightener comprising a supporting member, two arms hinged to said member at corresponding ends and extending in the same general direction from the support, rolling pressure devices on the free ends of the arms, each arm having thereon an ear, a rod extending slidably through said ears, shoulders on the ends of the rods, a spring surrounding the rod on the outer side of one ear beneath one of the shoulders, and the other shoulder engaging the outer side of the other ear.

4. A slack adjuster and belt tightener as set forth in claim 3, wherein the ears are curved, with their concave sides facing each other.

HARRY S. AUSHERMAN.

References Cited in the file of this patent

UNITED STATES PATENTS

| Number | Name | Date |
| --- | --- | --- |
| 417,512 | Rosquit | Dec. 17, 1889 |
| 529,268 | Hopkirk | Nov. 13, 1894 |
| 976,115 | Bard | Nov. 15, 1910 |

FOREIGN PATENTS

| Number | Country | Date |
| --- | --- | --- |
| 261,056 | Germany | June 13, 1913 |